UNITED STATES PATENT OFFICE.

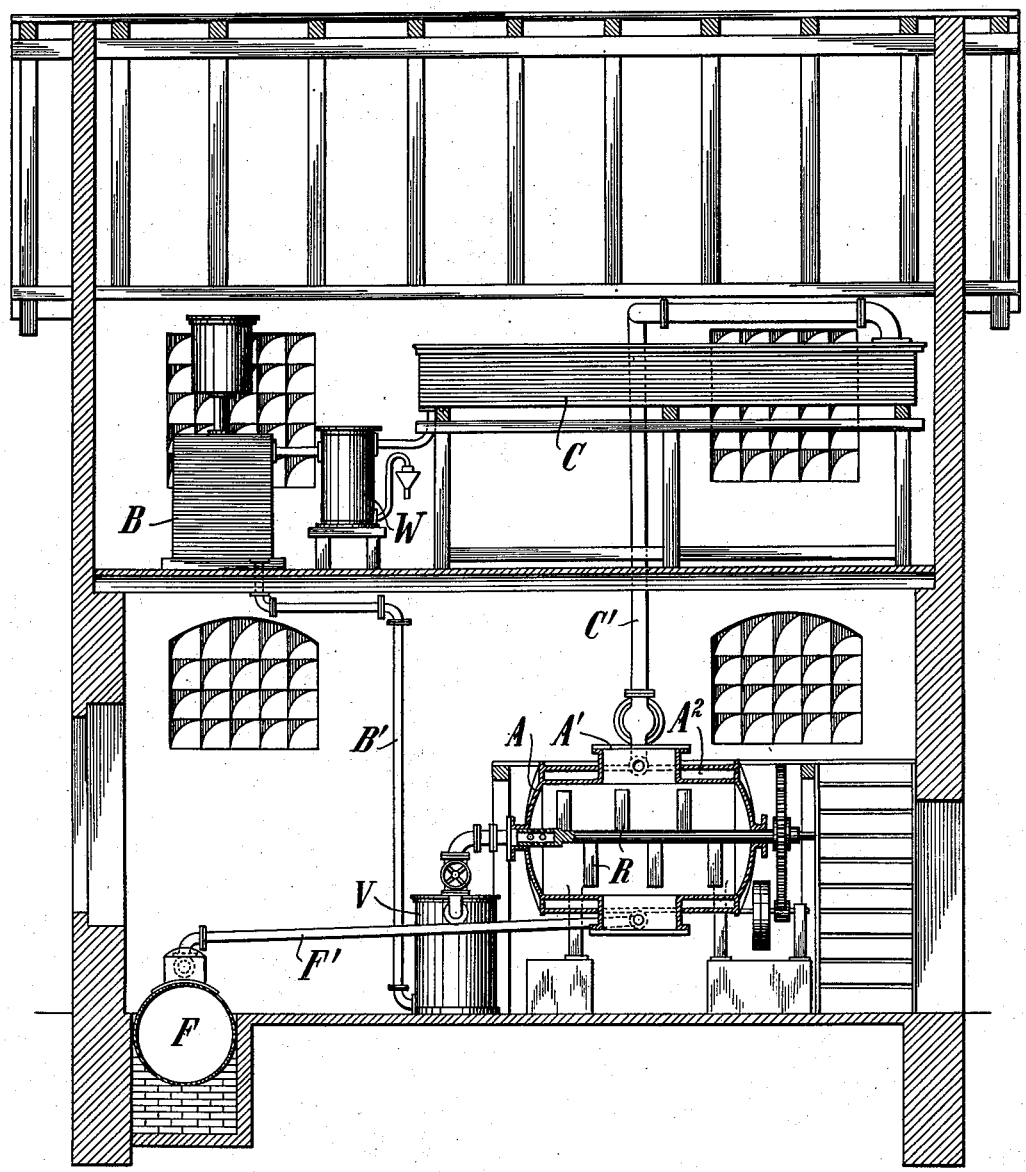

JOHANNES GUSTAV GROTKASS, OF BREMEN, AND KARL SCHIRM, OF LEIPZIG-PLAGWITZ, GERMANY.

MEAT-POWDER.

1,005,539. Specification of Letters Patent. Patented Oct. 10, 1911.

Application filed June 23, 1909. Serial No. 503,889.

*To all whom it may concern:*

Be it known that we, JOHANNES GUSTAV GROTKASS, a subject of the King of Prussia, residing at 32 Georgstrasse, Bremen, Germany, and KARL SCHIRM, a subject of the King of Saxony, residing at 48 Naumburgerstrasse, Leipzig-Plagwitz, Germany, have invented certain new and useful Improvements in Meat-Powder; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The subject-matter of our invention is an improved process of obtaining stable meat-powder from carcasses, fish and like animal offal.

The question of working up and utilizing carcasses, confiscated meat from slaughter-houses, fish and like animal offal was a very serious one heretofore. This fact occasioned the "Deutsche Landwirtschaftsgesellschaft" to endeavor to solve the question by a series of competitions in the years 1893, 1895, 1897 and 1906 for devices for utilizing or destroying such substances. In a treatise by Dr. M. Hoffmann, Berlin: *"Apparate und Transportwagen zur Verwertung und Beseitigung von Tierkadavern"* (Berlin 1907, Deutsche Landwirtschaftliche Gesellschaft, printed as manuscript) these competitions are discussed. The described systems for realizing the value of carcasses proposed working up the carcasses into meat-powders which are to be used as manure and foodstuffs. Meat-powder was made heretofore by the material being treated directly or indirectly with steam in closed apparatus, whereby it was sterilized and the fat partially extracted. The material was then dried in the same or other apparatus. Such processes have various disadvantages. For example, when treating the starting material with steam much glutinous liquid is obtained; this must either be conducted away as waste water, which is to be rejected from a hygienic standpoint, or it must be uneconomically inspissated in the evaporating apparatus, then added again to the carcass material and be dried again with this. A further great disadvantage, however, is that the fat is only partially separated by the steaming; the meat-powder thus obtained consequently contains much fat. As follows from the above mentioned publication of the Deutsche Landwirtschaftsgesellschaft it still contains 12 to 20% of fat. Therefore the meat-powder readily becomes rancid, is not edible, and consequently unfit for feeding purposes. It has already been attempted to subject meat-powder obtained in such a manner, and also fish-powder for example, subsequently to a process for removing fat; this subsequent treatment is expensive and also not recommendable because the material suffers under the double treatment and loses in value.

Now according to our process it is possible to remove the fat from and simultaneously to dry fresh, nondisintegrated carcasses, fish and other fresh animal offal in one single operation and to work it up in this manner to sterilized dry, stable meat-powder from which the fat is removed, but which contains all the other constituents, such as glue, gluten-like substances, of the starting material. This is done by subjecting the material in suitable manner to the action of benzin and benzin vapors or similar solvents and their vapors. Both the working up of entire carcasses in my apparatus, in one single operation, and the employment of benzin which boils with difficulty (*i. e.* which shows a comparatively high boiling point) or the vapors of the same for the purpose of drying and removing the fat from entire carcasses in one single operation is absolutely new.

It is well-known to treat bones and the like with benzin or similar solvents, and this process has been used heretofore almost exclusively in working up bones and in the glue industry. But the benzin treatment in the manner well-known heretofore cannot, however, be applied to entire carcasses or even to somewhat large parts of the same. Namely, whereas porous and disintegrated bones readily admit of the passage of liquid and gaseous benzin, in the case of meat and similar material benzin is operative only on the surface. It does not penetrate into the material. Therefore it has heretofore been possible to sterilize, remove fat from, and dry only finely disintegrated parts of meat, fish-powder and meat-powder, by means of benzin and similar solvents; all attempts to treat whole carcasses, on the contrary, even by means of other solvents have been unsuccessful. With alcohol, for example, a product which it is true was well dried, but from which the fat was badly removed has been obtained.

Now it has been found that the surface of a carcass treated with benzin vapors or the like, in so far as the vapors have exercised an influence on it, can be readily scraped off, and then a dry meat-powder free from fat is obtained. This observation has led in our process to continuously or intermittently moving the carcass material in suitable manner, e. g. by means of a stirrer, during the benzin treatment, so that by the reciprocal friction of the individual bodies against one another the meat-powder formed on the surface of the body under the fat-removing and sterilizing action of the benzin is scraped off. Consequently, the benzin vapors constantly contact with new surfaces of the material which is being worked up, so that the carcass gradually entirely falls to pieces and a completely sterilized, dry meat-powder remains behind. In this manner it is obtained that, firstly, the formation of glue and glutinous liquid is practically prevented (which represents an essential advantage) since the drying of the glutinous liquid is connected with certain difficulties preventing the production of a powdery or crumbly mass, and, secondly a dry, sterile meat-powder product which is as free as possible from particles of bone and fat is obtained.

For carrying our process into practice we preferably use an extraction plant such as is represented in elevation and partly in section by way of example in the accompanying drawing.

Referring to the drawing, the carcasses are put into the extractor A, having a stirrer R, whereupon its inlet A' is hermetically sealed. By means of a pipe or conduit B' benzin is now conducted from the benzin tank B into the vaporizer V, from which it enters in the form of vapor into the extractor and there partially condenses and dissolves the fat on the surface of the carcasses. The excess of vapor is used for heating the carcass material and for vaporizing the water in the same. The aqueous and benzin vapors pass through a pipe C' to the condenser C, are condensed, and the liquid is conducted to a separator W. The water is here separated from the benzin, the benzin flows back to the benzin tank B and can be supplied again to the vaporizer. In order to sterilize the carcass completely and to disintegrate the meat more rapidly, the meat is placed under benzin pressure from time to time, in order to obtain a sufficiently high pressure for the fat-solvent and a rapid evaporation of the moisture of the superficial parts, and to conduct away the aqueous vapor rapidly. Care must, however, always be taken that the operation takes place substantially in a flowing vapor of the fat-solvent and that glue is not formed. For producing this pressure more rapidly the extractor is provided with a steam-heated jacket $A^2$.

When the apparatus works the stirrer R is driven, and the material is attacked in the manner described above by the benzin vapors. The water is gradually entirely removed from the carcass material, the fat is entirely extracted and the meat is more and more disintegrated, so that at the end of the process only dry meat-powder free from fat mixed with bones is in the extractor. The solution of fat which forms during the extraction is continuously conducted through a pipe F' to the fat-distiller F. This fat is liberated from the benzin by heating the solution by means of a heating-coil, and the benzin still adhering to the meat-powder is entirely driven out by blowing in live steam, so that all the benzin is obtained in the benzin plant after the completed operation.

Our process, which provides a perfectly new method of working up carcasses, is of exceptional importance both economically and practically. Owing to there being no putrefying glutinous liquids in the perfectly sterilized waste water which is produced in only small quantities, our process denotes progress which is not to be underestimated in hygienic and sanitary respects. On the other hand, both as regards yield and quality of the product obtained, our process yields results which excel by far those of all processes known heretofore. Whereas formerly a yield of 18-20% meat-powder and 8-10% fat was obtained, the same are now increased to 25% meat-powder and $12\frac{1}{2}$% fat. In addition, the meat-powder made according to our new process is of excellent quality.

As follows from the following analysis, by Professor Kelmer, Möckern, of the meat-powder obtained according to our new process: 12.24% water, 13.82% ash, 2.58% fat, 70.05% protein, 65.35% protein soluble in pepsin-hydrochloric acid, the meat-powder is almost free from fat but rich in nutrients. No property injurious to health could be determined.

We claim:

1. The herein described process of obtaining stable meat powder poor in fat and rich in nutrients from meat, fish and the like, which comprises subjecting the material to the action of flowing vapors of a fat solvent and simultaneously subjecting the material to friction.

2. The herein described process of obtaining stable meat powder poor in fat and rich in nutrients from meat, fish and the like, which comprises subjecting the material to the action of flowing heated benzin vapor and simultaneously subjecting the material to friction.

3. The herein described process of obtaining stable meat powder poor in fat and rich in nutrients from meat, fish and the like, which comprises stirring the material in a suitable container and subjecting it to friction and simultaneously subjecting the material to flowing benzin vapor and intermittently subjecting the material to benzin vapor under pressure.

4. The herein described process of obtaining stable meat powder poor in fat and rich in nutrients from meat, fish and the like, which comprises moving or stirring the material in a suitable container to subject it to friction and to the action of a current of flowing vapor of a fat solvent while temporarily heating the material.

5. The herein described process of obtaining stable meat powder poor in fat and rich in nutrients from carcasses, fish, and like animal offal, which comprises simultaneously subjecting the same to the action of a current of heated vapors of a fat solvent and to friction so as to remove the dried and degreased parts in the form of a disintegrated fine mass from the surface of the animal bodies and pieces to be treated thus offering fresh surfaces to the simultaneous action of the current of heated vapors of the fat solvent and to friction, and removing the dissolved fat.

6. The herein described process of obtaining stable meat powder poor in fat and rich in nutrients from carcasses, fish and like animal offal, which comprises simultaneously subjecting the same to the action of a current of heated vapors of a fat solvent and to friction so as to remove the dried and degreased parts in the form of a disintegrated fine mass from the surface of the animal bodies and pieces being treated, thus offering fresh surfaces to the simultaneous action of the current of heated vapors of the fat solvent and to friction, and removing the dissolved fat, temporarily increasing the pressure of the vapor during the operation and after disintegration subjecting the product to the action of live steam.

7. The herein described process of obtaining stable meat powder poor in fat and rich in nutrients from meat, fish and the like which comprises subjecting the same to the action of a current of fat solvent flowing past and around said material and simultaneously stirring the material whereby said material is subjected to reciprocal friction and the meat powder formed on the surface is removed and new surfaces are constantly exposed to the solvent.

In testimony that we claim the foregoing as our invention, we have signed our names in presence of two subscribing witnesses.

J. GUSTAV GROTKASS.
KARL SCHIRM.

Witnesses:
   EMIL C. DANNENBERG,
   WOLDEMAR HAUPT.